No. 644,878. Patented Mar. 6, 1900.
D. W. STINSON.
AUTOMATIC CIRCUIT BREAKER.
(Application filed July 3, 1899.)
(No Model.) 2 Sheets—Sheet 1.
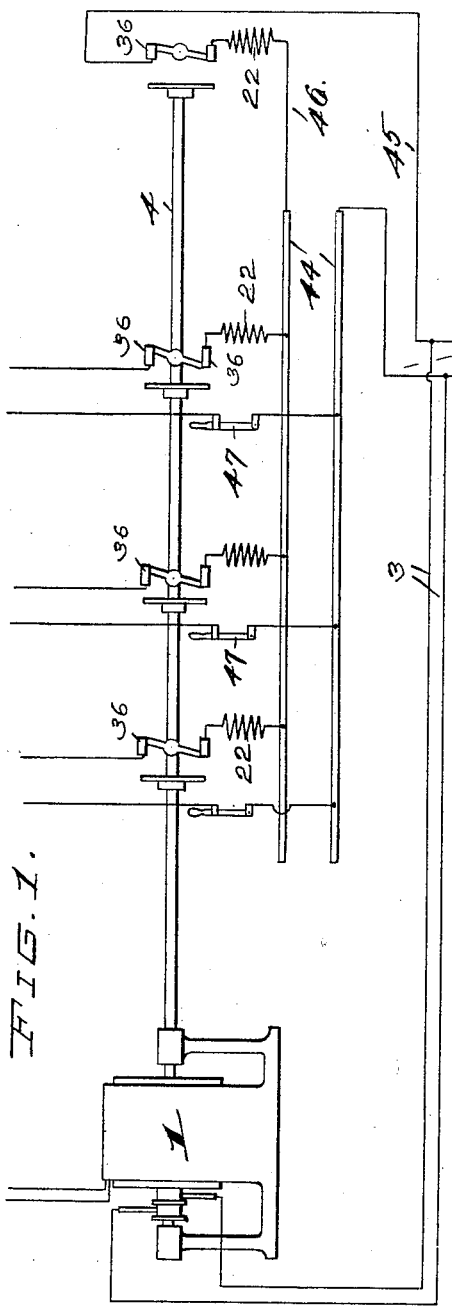
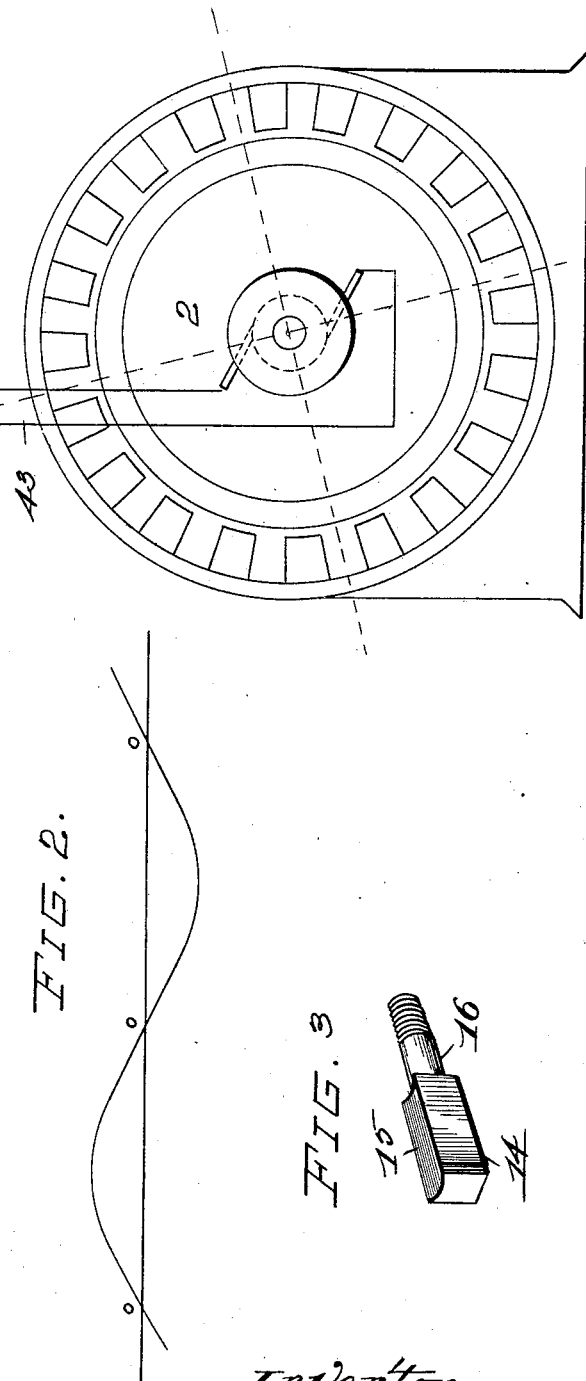
Inventor
David W. Stinson:—
By Higdon & Longan Atty's
THE NORRIS PETERS CO., PHOTO-LITHO., WASHINGTON, D. C.

No. 644,878. Patented Mar. 6, 1900.
D. W. STINSON.
AUTOMATIC CIRCUIT BREAKER.
(Application filed July 3, 1899.)
(No Model.) 2 Sheets—Sheet 2.
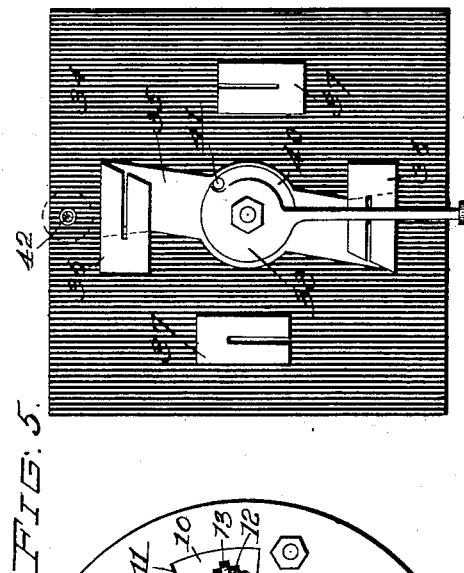
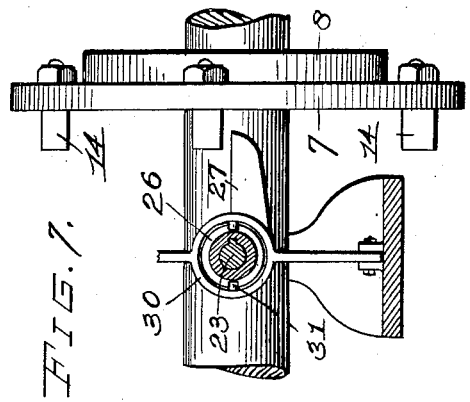
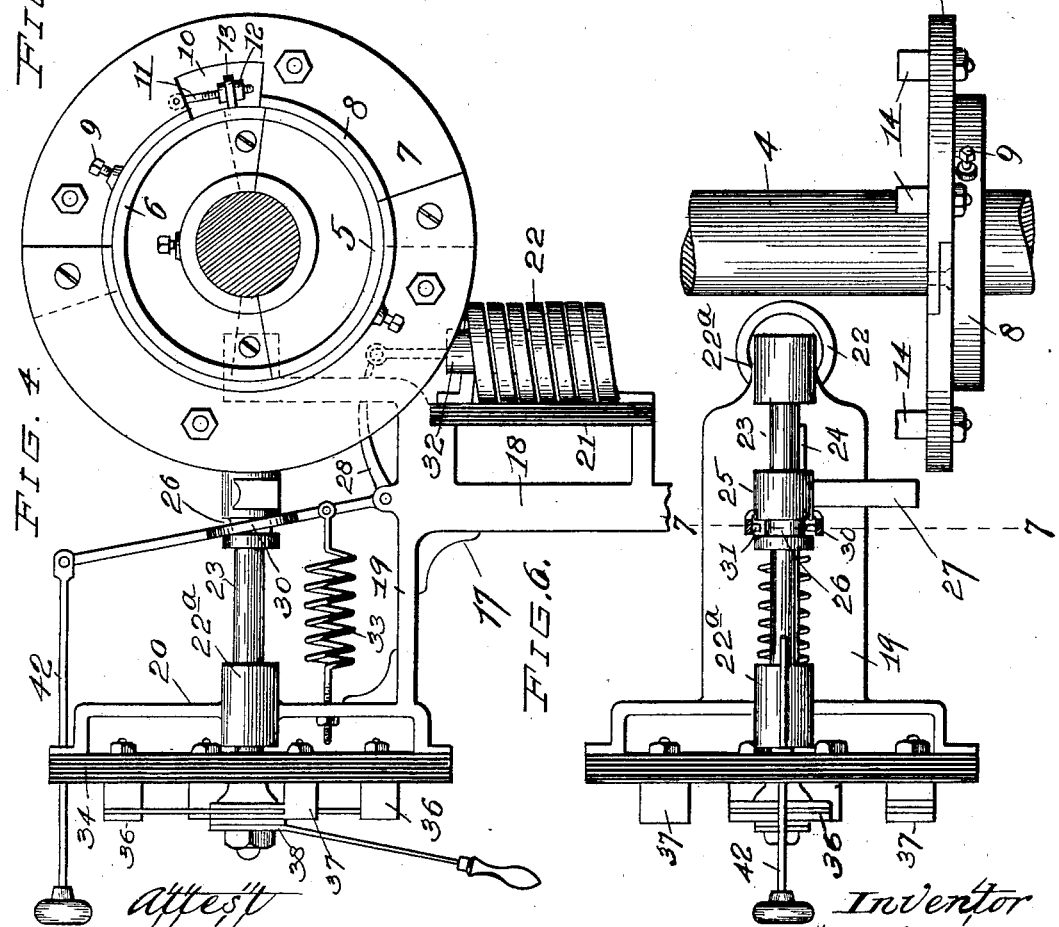
Inventor
David W. Stinson:-
By Higdon & Longan atty's

UNITED STATES PATENT OFFICE.

DAVID W. STINSON, OF ST. LOUIS, MISSOURI.

AUTOMATIC CIRCUIT-BREAKER.

SPECIFICATION forming part of Letters Patent No. 644,878, dated March 6, 1900.

Application filed July 3, 1899. Serial No. 722,748. (No model.)

*To all whom it may concern:*

Be it known that I, DAVID W. STINSON, of the city of St. Louis, State of Missouri, have invented certain new and useful Improvements in Automatic Circuit-Breakers, of which the following is a full, clear, and exact description, reference being had to the accompanying drawings, forming a part hereof.

My invention relates to method of and apparatus for preventing arcs or sparks between the switch-contact of a circuit-breaker in lighting and power circuits carrying alternating currents; and it consists of the novel construction, combination, and arrangement of parts hereinafter described and claimed.

The object of my invention is to provide means for automatically opening or breaking electric lighting and power circuits carrying alternating currents, which means shall be automatically and invariably operated whenever the mean effective current in the circuit in which said means is placed becomes greater than a predetermined value and which means will operate with absolute certainty to open the circuit instantaneously when the electromotive force or current is at the zero-point, thus precluding the possibility of the formation of destructive arcs between the switch-contacts.

In the drawings, Figure 1 is a diagrammatic view illustrating my invention, the same being applied to the shaft of a sychronous motor. Fig. 2 is a diagrammatic view illustrating the current-line and the points at which the circuit is broken in said line. Fig. 3 is a view in perspective of one of a series of contact-points made use of in carrying out my invention. Fig. 4 is a side elevation of the complete circuit-breaker, the shaft of the motor being shown in section. Fig. 5 is a front elevation of the insulated block or base in which the switch-blade operates. Fig. 6 is a plan view of the circuit-breaker. Fig. 7 is a sectional view taken approximately on the line 7 7 of Fig. 6.

Referring by numerals to the accompanying drawings, 1 indicates a motor operating synchronously with the generator 2, and there being the usual conductors 3 leading from the brushes of said generator to the motor. In the diagrammatic view in Fig. 1 I have illustrated a plurality of the circuit-breakers in position upon the shaft 4 of a synchronous motor, each of which circuit-breakers acts independently in its particular circuit, and at the end of the shaft 4 I have illustrated one of the circuit-breakers in the line from the generator to the working circuits.

In the construction of one of my improved circuit-breakers a ring 5, the same being made up of a plurality of segmental sections held together in any suitable manner, is removably fixed upon the shaft 4, integral with the flange of which ring is a laterally-projecting flange 6. A ring 7, made up of a plurality of segmental sections held together by screws or in any suitable manner, is provided on its inner edge with a flange 8, which rests directly upon the flange 6, and set-screws 9 pass through said flange 8 and engage upon this flange 6, thus adjustably locating the ring 7 upon the ring 5. Formed in the ring 7 is a recess 10, within which is pivotally held a screw-bolt 11, said screw-bolt passing through a screw-threaded collar 12, which is pivotally held in a lug 13, carried by the flange 6, this construction providing the means for adjusting the ring 7 upon the ring 5.

Rectangular contact-pins 14, having concaved contact-faces 15, are provided with integral shanks 16, which shanks pass through the ring 7, and upon the screw-threaded ends of said shanks are located nuts which rigidly position said pins upon the ring 7.

A bracket 17 is arranged just below and to one side of the shaft upon which the disk comprising the rings 5 and 7 is located, which bracket comprises a standard 18, a horizontal member 19, and a vertically-arranged member 20 at the end of said horizontal member 19. Fixed upon the vertical member 18 is a rectangular block or base of insulating material 21, upon which block is arranged a magnet-coil 22. Formed in the vertical member 20 and on the bracket integral with the opposite end of the horizontal member 19 is a pair of horizontally-alined bearings 22ª, in which is arranged for rotation a shaft 23. Arranged to slide upon a feather 24 on said shaft 23 is a sleeve 25, in one end of which is formed a continuous groove 26, and integral with and projecting laterally from the opposite end of said sleeve 25 is a finger 27, having a concaved contact-surface, and the outer end of said finger 27 projects into a plane adjacent the edge of the ring 7.

28 indicates a bell-crank, which is fulcrumed to the horizontal member 19 of the bracket, the vertical arm of which bell-crank is provided with a yoke 30, which passes around the sleeve 25, there being pins 31 passing through said yoke which engage in the groove 26, and the horizontal arm of this bell-crank extends to a point immediately above the center of the coil 22, and pivotally connected to the end of said horizontal arm is the upper end of a reciprocating core 32, the same operating through the magnet-coil 22. Secured to the lower portion of the vertical arm of this bell-crank is one end of a retractile coil-spring 33, the opposite end thereof being adjustably secured to the vertical member 20 of the bracket.

Secured to the vertical member 20 of the bracket is a block or plate of insulating material 34, in the center of which is formed an opening through which passes the shaft 23, and fixed upon the end of said shaft that projects through this opening is a plate or blade 35, the same being insulated from said shaft 23. The ends of this plate or blade are adapted to enter between spring-fingers 36, oppositely arranged upon the block 34, to which oppositely-arranged fingers are connected the terminals of the circuit in which my circuit-breaker is located. A second pair of oppositely-arranged spring-fingers 37 are located at right angles to the first-mentioned pair of fingers, said fingers 37 being for the purpose of engaging the ends of the plate or blade 35 when the blade or plate is turned. Loosely mounted upon the end of the shaft 23 that projects through the opening in the center of the block 34 and outside the plate 35 is a disk 38, the same being provided with an operating-handle 39, and a portion of the periphery of said disk 38 is cut away, as indicated by 40, to allow the movement in one direction of a pin 41, that is carried by the plate 35. When said plate 35 is engaged between the spring-fingers 36 and the circuit is complete, this pin 41 occupies the upper end of the cut-away portion 40.

Pivotally connected to the upper end of the vertical arm of the bell-crank is a horizontally-arranged rod 42, the same passing through the top of the plate 34 and being provided on its outer end with an operating-handle.

Referring now to the diagrammatic view, it will be seen that one of the conductors 3 is connected to a conductor 43, which leads from one of the brushes of the collecting-ring of the generator to one of a pair of bars 44, the opposite conductor 3 being connected to a conductor 45, which leads from the opposite brush on the collecting-ring of the generator to one of the pair of fingers 36 of the circuit-breaker on the end of the synchronous-motor shaft 4. The opposite one of these fingers 36 is connected to the coil 22 of this particular circuit-breaker, which coil 22 is connected by the conductor 46 to the opposite one of the bars 44. One of the terminals of each of the working circuits is connected to one of the pair of fingers 36 for the corresponding circuit-breaker, there being a conductor leading from the opposite one of said fingers 36 to the coil 22 and from thence to the top one of the bars 44. The terminal of the opposite conductor of each circuit leads from the ordinary knife-blade switch 47 and from thence to the lower one of the bars 44.

To attain the best results with my improved circuit-breaker and to cause the same to act at the desired point, it is essential that the ring 7 be adjusted upon the ring 5 so that the contact-pins 14 are in a position such as that when the sleeve 25, carrying the finger 27, is moved along the shaft 23 toward said pins contact will be made between said finger and any one of said pins at a time when the current is at a zero-point, and to properly adjust these pins the operator loosens the set-screws 9 and manipulates the collar 12 so as to move the screw-bolt 11 and ring 7 in the desired direction, and when the pins 14 have thus been properly adjusted the set-screws 9 are tightened, so as to rigidly position the ring 7 upon the ring 5. When the circuit-breaker is set for use, the blade 35 has its ends engaged between the spring-fingers 36, thus establishing the circuit, and when in this position the vertically-moving core 32 is at its upper limit of movement and the sliding sleeve 25, carrying the finger 27, is at its limit of movement away from the path of travel of the pins 14.

The operation is as follows: The circuit-breaker shaft 4 is set in motion by starting up in the usual manner the synchronous motor 1, so that it will operate synchronously with the generator 2. When the load on the circuit in which the circuit-breaker is positioned exceeds the predetermined value, the increased current through the coil 22 of this particular circuit-breaker will draw the core 32 downwardly into said coil, and this movement actuates the bell-crank 28 and causes the sleeve 25 to move laterally upon the shaft 23 toward the shaft of the synchronous motor. This movement brings the finger 27 into the path of travel of the pins 14. The convex contact-face of one of said pins will engage against the convex face of the finger 27, and said finger will be drawn downwardly, thus partially rotating the shaft 23 and throwing the ends of the blades 35 out of engagement from between the spring-fingers 36 and into and between the pairs of fingers 37, thus breaking the circuit and accomplishing the desired result. Owing to the adjustment of the pins 14 this operation or breaking of the circuit takes place instantly and at a time when the current is at zero-point, as indicated by the diagrammatic view in Fig. 2. The reason the circuit is broken while the current is passing through the zero-point or at the zero value (see Fig. 2) is that at that predetermined point the circuit may be broken without injury by sparking to the blade 35 or the contacts 36. The tripping-disk is preferably adjusted relative to the motor-shaft to break the current at the zero value just at the instant when the blade 35 is leaving the contacts 36, but it will be readily seen that the breaking of the circuit can be accomplished at any predetermined point on either side of the zero-point, this being accomplished by adjusting the ring 7 upon the ring 5. The angular position of the tripping-ring 7 with relation to the armature of the motor may be adjusted for the purpose of compensating for the difference in phase relations of current and electromotive force. The retractile coil-spring 33 is so adjusted as that the predetermined value or strength of current circulating in the coil 22 will be required before the sleeve 25, carrying the finger 27, is moved far enough to engage with one of the pins 14.

To reset the circuit-breaker, the operator engages the handle 39 and swings the same to the right and upwardly, and in so doing engages the pin 41, carried by the blade 35, and causes the ends of said blade 35 to pass out from between the spring-fingers 37 and to reengage between the spring-fingers 36, thus reestablishing the circuit.

It will be readily seen how with slight alterations and construction the circuit-breaker will operate on the shaft of a generator, thus breaking or cutting out the main circuit.

My improved circuit-breaker can be adjusted to operate whenever the load upon the circuit becomes too great, and the cutting out of the circuit is accomplished at a time when the current in said circuit is at the zero-point, thus precluding the formation of destructive arcs between the contact-points of the switch. The circuit-breaker is simple and entirely automatic, or, if desired, it can be operated by hand by engaging the handle on the end of the rod 42 and pushing the same inwardly. Said circuit-breaker is especially applicable for use upon the shaft of a synchronous motor owing to the fact that the armature or rotating member of the motor runs in synchronism with the current from the generator, and it can be conveniently placed at any point of distribution which may be far removed from the generator.

I claim—

1. A lighting or power circuit arranged with a generator for supplying said circuit with alternating currents, a switch, and means whereby said switch is actuated when the current or electromotive force in said circuit is at the zero-point of any one alternation, substantially as specified.

2. The combination with an electric lighting or heating circuit supplied with alternating currents, of a generator, a switch, and means whereby said switch is opened when the current of any one alternation is at the zero value and while the mean effective current in said circuit is greater than a predetermined value, substantially as specified.

3. In an automatic circuit-breaker, a switch, a rotatably-arranged shaft carrying the blade of said switch, a sleeve arranged to slide upon said shaft, a finger integral with said sleeve, an electromagnet for actuating said sleeve, an adjustable disk mounted upon a synchronous-motor shaft, and pins projecting laterally from said disk, substantially as specified.

4. The combination with an alternating-current synchronous motor, a circuit and an alternating-current generator of a switch arranged in said circuit, means carried by the synchronous-motor shaft for actuating said switch when the load on the circuit becomes too great, and an electromagnet in the circuit which acts to position the parts for the cut-out operation, substantially as specified.

5. In a device of the class described, an alternating-current generator, a circuit leading from said generator, a motor operating synchronously with the alternations derived from said generator, a switch in the circuit leading from the generator, means carried by the shaft of the synchronous motor for actuating the switch when the load for the generator becomes too great, which means operates to open the circuit at a time when the current in the circuit is at a zero value, and an electromagnet in the circuit leading from the generator, which acts to position the parts for the cut-out operation, substantially as specified.

6. In a device of the class described, an alternating-current generator, a circuit leading from said generator, a motor operating synchronously with said generator, a switch in the circuit, means carried by the shaft of the synchronous motor for actuating the switch when the load for the generator becomes too great, which means operates at a time when the current in the circuit is at the zero-point, substantially as specified.

In testimony whereof I affix my signature in presence of two witnesses.

DAVID W. STINSON.

Witnesses:
EDWARD E. LONGAN,
M. P. SMITH.